US 12,407,682 B2

(12) United States Patent
Albero et al.

(10) Patent No.: US 12,407,682 B2
(45) Date of Patent: Sep. 2, 2025

(54) SYSTEM, DEVICE, AND METHOD FOR PERFORMING SECURED OPERATIONS

(71) Applicant: Bank of America Corporation, Charlotte, NC (US)

(72) Inventors: George Anthony Albero, Charlotte, NC (US); Olga Caroline Kocharyan, Matthews, NC (US); Dustin Paul Stocks, Matthews, NC (US); Maharaj Mukherjee, Poughkeepsie, NY (US); Karen Davis, Charlotte, NC (US); Lisa Snow Pugh, Charlotte, NC (US); Anna Maria Mirarchi, Charlotte, NC (US); Sanjay Arjun Lohar, Charlotte, NC (US); James Joseph Siekman, Charlotte, NC (US); Anna Xu, New York, NY (US); Samantha Ilse Quales, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 155 days.

(21) Appl. No.: 18/479,917

(22) Filed: Oct. 3, 2023

(65) Prior Publication Data
US 2025/0112916 A1    Apr. 3, 2025

(51) Int. Cl.
G06F 21/00    (2013.01)
H04L 9/40    (2022.01)

(52) U.S. Cl.
CPC ...... *H04L 63/0853* (2013.01); *H04L 63/0861* (2013.01); *H04L 63/107* (2013.01)

(58) Field of Classification Search
CPC ............ H04L 63/0853; H04L 63/0861; H04L 63/107
See application file for complete search history.

(56) References Cited

U.S. PATENT DOCUMENTS

| | | |
|---|---|---|
| 8,893,212 B2 | 11/2014 | Reisman |
| 9,276,437 B2 | 3/2016 | Partovi et al. |
| 9,419,951 B1 | 8/2016 | Felsher et al. |
| 9,491,564 B1 | 11/2016 | Raleigh |
| 9,996,315 B2 | 6/2018 | Barnes, Jr. |
| 10,212,174 B2 | 2/2019 | Muddu et al. |
| 10,362,940 B2 | 7/2019 | Tran |
| 10,708,264 B1 * | 7/2020 | Buckingham ........... G06F 21/34 |
| 10,872,333 B2 | 12/2020 | Dua |
| 10,922,436 B2 * | 2/2021 | Hassan ............... G06F 21/6254 |
| 10,933,153 B2 | 3/2021 | Shell et al. |
| 11,126,975 B2 | 9/2021 | Haldenby et al. |
| 12,039,072 B2 * | 7/2024 | Gehtman ............... G06F 21/602 |

(Continued)

FOREIGN PATENT DOCUMENTS

EP    3183857 B1 *    7/2018    ......... H04L 63/0807

*Primary Examiner* — Kendall Dolly

(57) ABSTRACT

A device for performing a secured operation is disclosed. The device is embedded with a predefined data item and verification information. The verification information is uniquely associated with the user of the device. The verification information is linked to the identity of the user. The verification information is configured to be extracted in conjunction with the secured operation being performed. The secured operation is performed in response to the verification information being verified. A system and method for performing the secured operation are also disclosed.

19 Claims, 3 Drawing Sheets

(56) References Cited

U.S. PATENT DOCUMENTS

| | | | |
|---|---|---|---|
| 2014/0082721 A1* | 3/2014 | Hershman | G06F 21/44 726/16 |
| 2015/0089591 A1* | 3/2015 | Harris | G06F 21/43 726/4 |
| 2017/0180358 A1* | 6/2017 | Harris | G06Q 20/407 |
| 2018/0176318 A1 | 6/2018 | Rathod | |
| 2019/0121344 A1 | 4/2019 | Cella et al. | |
| 2019/0188471 A1 | 6/2019 | Osterhout et al. | |
| 2019/0227993 A1 | 7/2019 | Prahlad et al. | |
| 2020/0007331 A1 | 1/2020 | Wentz | |
| 2020/0067709 A1* | 2/2020 | Brown | H04L 9/3231 |
| 2020/0213838 A1* | 7/2020 | Wang | H04W 12/50 |
| 2020/0274727 A1 | 8/2020 | Ansari et al. | |
| 2020/0351341 A1 | 11/2020 | Illowsky et al. | |
| 2021/0102978 A1 | 4/2021 | Spanier et al. | |
| 2021/0240783 A1 | 8/2021 | Ricci | |
| 2022/0187870 A1 | 6/2022 | Hotelling | |
| 2022/0318206 A1 | 10/2022 | Prahlad et al. | |
| 2022/0405375 A1* | 12/2022 | Lin | H04L 9/3231 |
| 2024/0346852 A1* | 10/2024 | Tussy | G06V 40/168 |

* cited by examiner

SYSTEM, DEVICE, AND METHOD FOR PERFORMING SECURED OPERATIONS

TECHNICAL FIELD

The present disclosure relates generally to information security, and more specifically to a system, device, and method for performing secured operations.

BACKGROUND

People use devices to communicate different kinds of data to other people. Devices are not generally linked to their respective users. For example, a device may be used by a person who is not authorized to access the device. In such cases, if a bad actor gets unauthorized access to a device, they may use the device at the expense of the authorized user of the device.

SUMMARY

The disclosed system described in the present disclosure is particularly integrated into a practical application of adding security measures to devices that may be used to access information associated with users. In particular, the disclosed system implements an unconventional device that is embedded with verification information that uniquely ties the device to the user of the device and any others that the user of the device adds to the list of authorized users. The disclosed system also increases the security of the device and provides more secure access to information that is associated with the device. Therefore, the disclosed system improves the security of information associated with the device and reduces the instances of fraudulent activities in cases where bad actors access the devices. In some examples, the device may be a file or an instrument from which information associated with the user may be accessed.

In the current implementation of devices, a device is not uniquely linked to the identity of the respective user, for example, the owner of the device. Therefore, in one example, if a bad actor gets hold of the device, they may use the device to perform operations, such as access information or a profile associated with the user. Therefore, with current techniques, there is a lack of security in providing secure access to devices.

The disclosed system is configured to provide a solution to this and other technical problems in the realm of information security technology. For example, the disclosed system is configured to implement a device that is uniquely linked to one or more authorized users. Therefore, the device can only be used by its respective authorized users. In some embodiments, the device may be embedded with the verification information that is associated with the authorized user. In some examples, the verification information may include a watermark, among others. In some embodiments, certain information may be encoded within the verification information. In some embodiments, the information may be encoded within the verification information using steganography techniques, quick response (QR) code implementation techniques, or other information encoding techniques. In some examples, the information may include an image, a signature, security questions and respective answers, and biometric data associated with the user.

When a user wants to use the device to perform an operation (such as transferring some portion of a data item to another party), the user may present the device to a receiving device to perform the operation using the device. In this process, the receiving device may scan the device and decode the verification information. In response, the information that is embedded or encoded into the verification information may be identified. If it is determined that the extracted information is verified, the user is allowed to perform the requested operation using the device.

In an example scenario, assume that the user wants to transfer the data item to another party. For example, to this end, the user may present the device to the receiving device that is configured to transfer the data item to the other party. The receiving device may determine whether the device is associated with to the user. To this end, the receiving device may scan the device and detect the verification information embedded in the device. The receiving device may decode the verification information to extract the information. The receiving device may determine whether the extracted information is verified. If it is determined that the verification information is verified, the receiving device may determine that the device is associated with the user. In response, the receiving device may perform the operation requested by the user.

In this manner, the disclosed system implements security measures to the device so that only the authorized user(s) are able to use the device. Accordingly, the disclosed system provides practical applications and technical improvements to the information security technology by implementing a device that is uniquely associated with authorized users, therefore, the security of the devices is increased and secured access to the devices is provided.

In some embodiments, a system for performing secured operations includes a first device communicatively coupled with a second device. The first device comprises a predefined data item, a sensor circuit, a network interface, and verification information. The predefined data item is associated on the first device or embedded into the first device. The sensor circuit is embedded within the first device and configured to detect a location coordinate of the first device. The network interface is embedded within the first device and configured to communicate the detected location coordinate of the first device. The verification information is embedded within the first device. The verification information is uniquely associated with a user associated with the first device. The verification information is encoded with information associated with the user. The verification information is linked to an identity of the user. The second device includes a communication interface operably coupled with a processor. The communication interface is configured to capture the verification information when the first device is within a threshold distance from the second device. The processor is configured to detect the information that is encoded within the verification information. The processor is further configured to determine whether the detected information is verified. The processor is further configured to transfer at least a portion of the predefined data item in response to determining that the detected information is verified.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
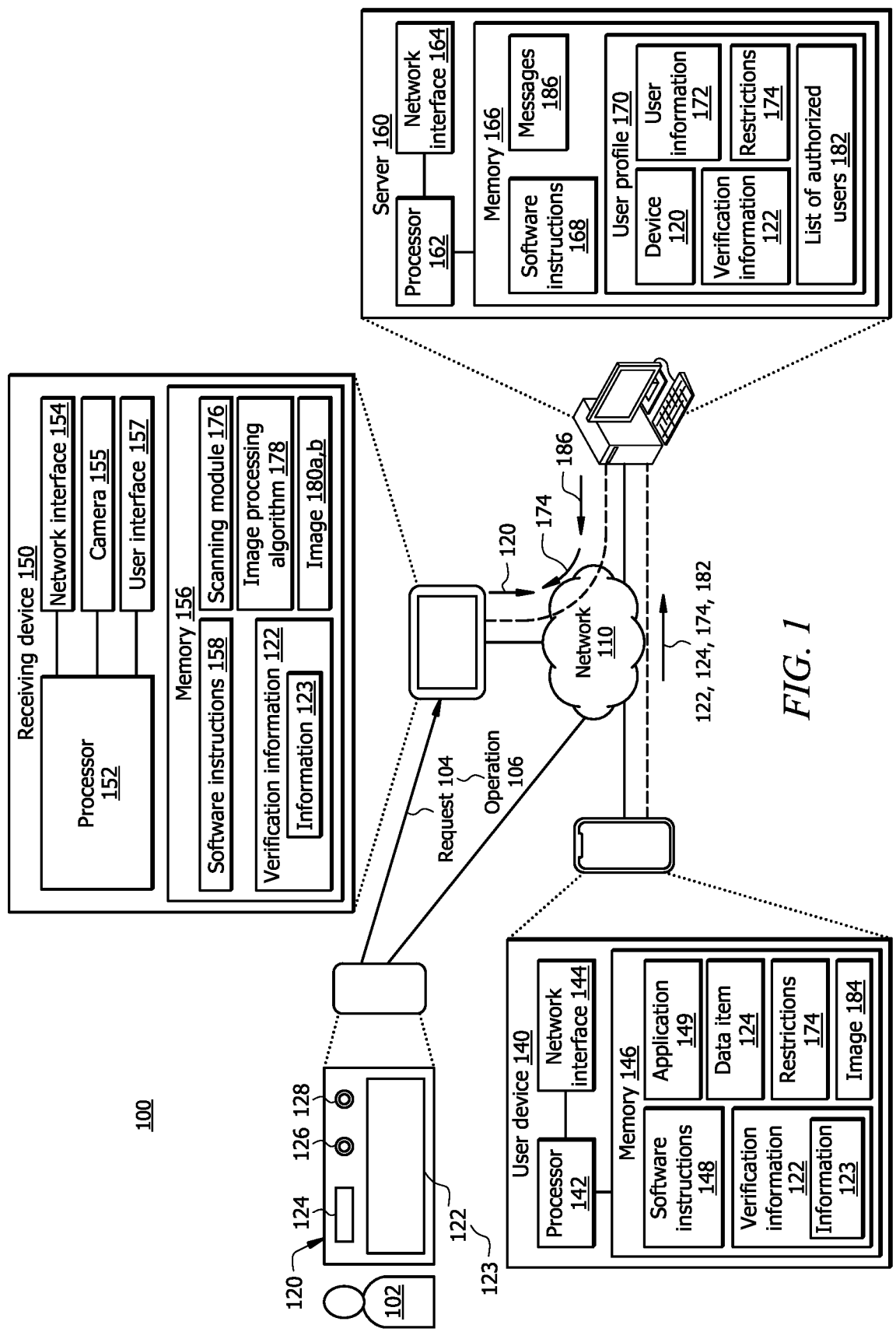
FIG. 1 illustrates an embodiment of a system configured to perform secured operations using a device.
Figure 2:
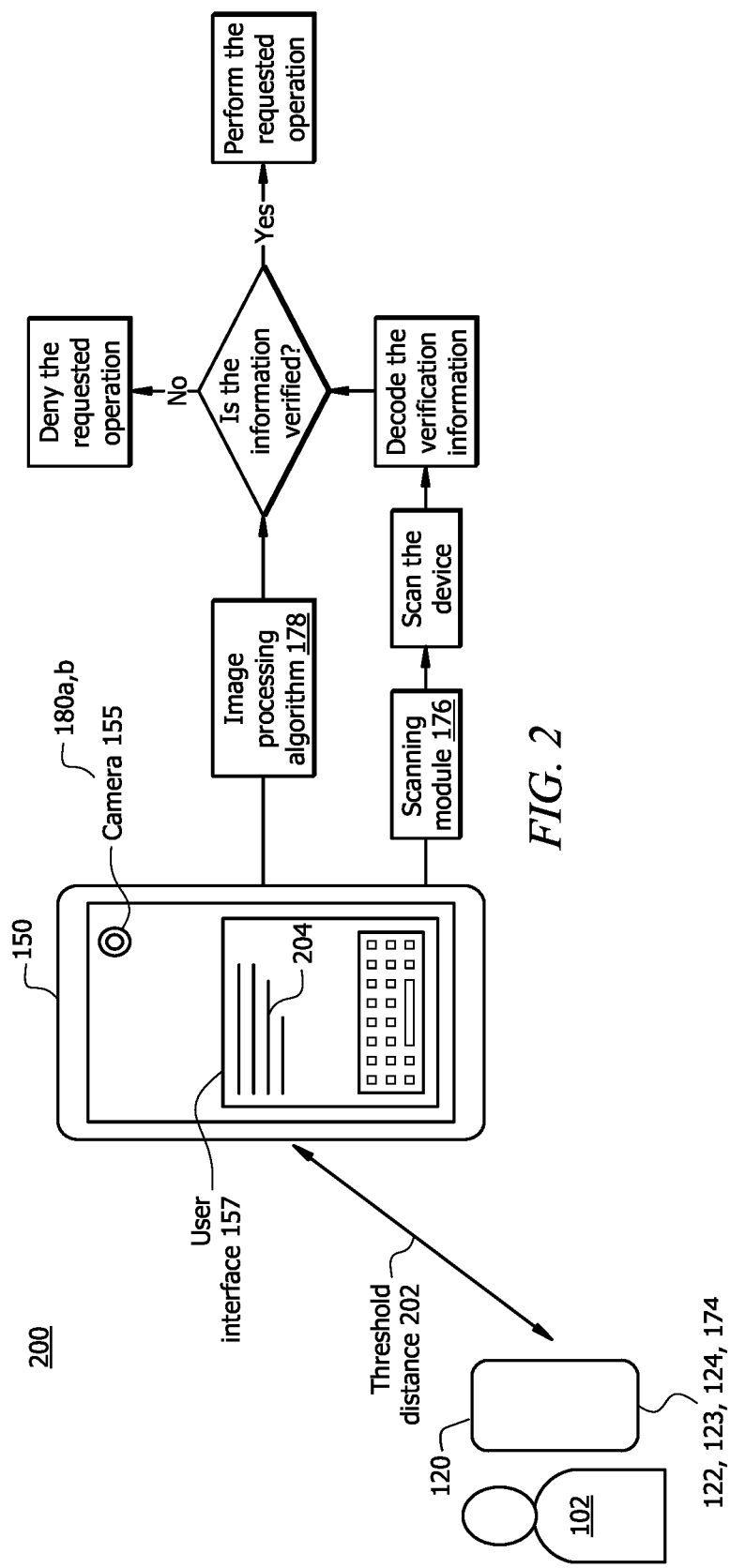
FIG. 2 illustrates an example operational flow of the system of FIG. 1.
Figure 3:
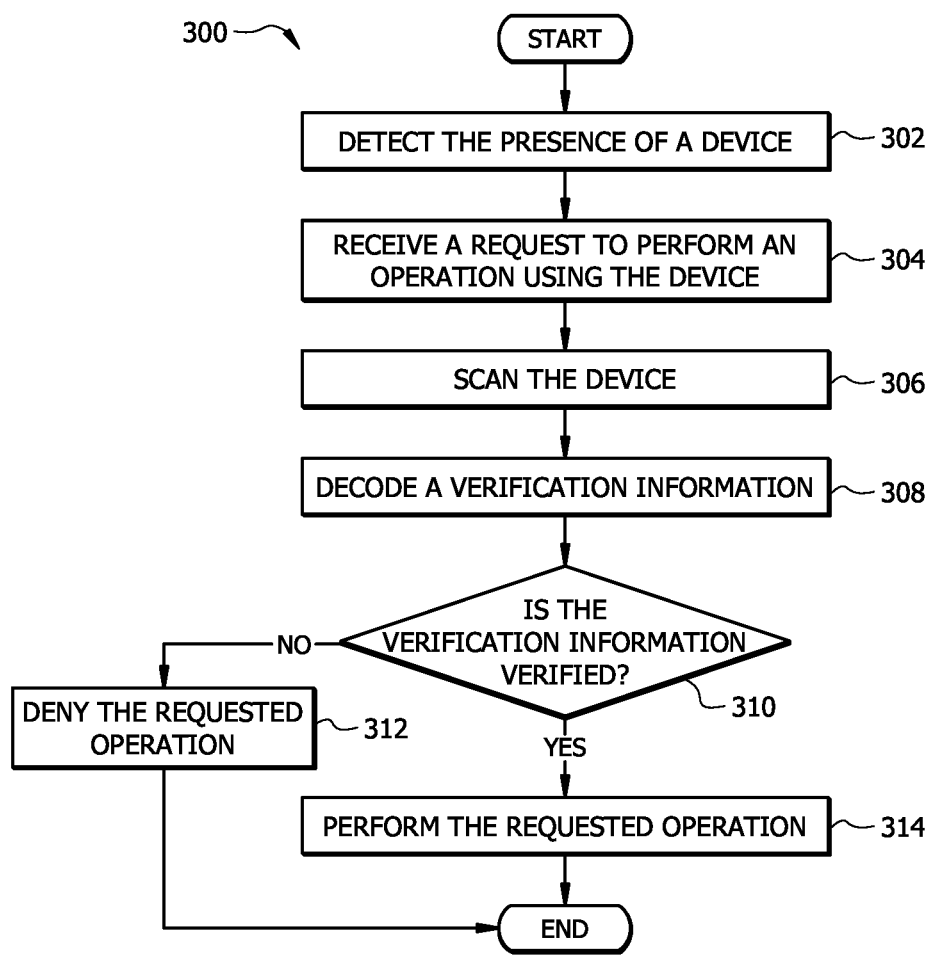
FIG. 3 illustrates an example flowchart of a method to perform secured operations using a device.

As described above, previous technologies fail to provide efficient and reliable solutions to perform secured operations using a device. Embodiments of the present disclosure and its advantages may be understood by referring to FIGS. 1 through 3. FIGS. 1 through 3 are used to describe systems and methods to perform secured operations using a device, according to some embodiments.

System Overview

FIG. 1 illustrates an embodiment of a system 100 that is generally configured to perform secured operations 106 by implementing a device 120 that is embedded with verification information 122 that uniquely ties the device 120 to a user 102 of the device 120 and any other authorized users that the user 102 of the device 120 adds to a list of authorized users 182. In some embodiments, the system 100 comprises the device 120 communicatively coupled to a user device 140, a receiving device 150, and a server 160 via a network 110. Network 110 enables communications between components of the system 100. The device 120 may be used to communicate or transfer at least a portion of the data item 124 to an intended receiver via the receiving device 150. The user device 140 includes a processor 142 in signal communication with a memory 146. The memory 146 stores software instructions 148 that when executed by the processor 142, cause the processor 142 to perform one or more operations of the user device 140. The receiving device 150 includes a processor 152 in signal communication with a memory 156. The memory 156 stores software instructions 158 that when executed by the processor 152, cause the processor 152 to perform one or more operations of the receiving device 150. The server 160 includes a processor 162 in signal communication with a memory 166. The memory 166 stores software instructions 168 that when executed by the processor 162, cause the processor 162 to perform one or more operations of the server 160. In other embodiments, system 100 may not have all of the components listed and/or may have other elements instead of, or in addition to, those listed above.

In general, the system 100 increases the security of the device 120 and provides more secure access to the data item 124 that is associated with the device 120. In some examples, device 120 may be or include a file, a document, or an instrument from which the data item 124 associated with the user 102 that may be accessed. In some examples, the device 120 may be or include an instrument where certain information is written, such as the verification information 122 and/or data item 124 are presented on the device 120.

The disclosed system 100 is configured to provide a solution to this and other technical problems in the realm of information security technology and implementing devices. For example, the system 100 is configured to implement a device 120 that is uniquely linked to one or more authorized users 102. Therefore, device 120 can only be used by its respective authorized users 102. In some embodiments, the device 120 may have embedded verification information 122 that is associated with the authorized user 102. In some examples, the verification information 122 may include a watermark, among other information embedding techniques. In some embodiments, certain information 123 may be encoded within the verification information 122. In some embodiments, the information 123 may be encoded within the verification information 122 using steganography techniques, quick response (QR) code implementation techniques, or other information encoding techniques. In some examples, the information 123 may include an image, a signature, security questions and respective answers, and/or biometric data associated with the user 102.

When user 102 wants to use the device 120 to perform an operation 106 (such as transferring some portion of the data item 124 to another party), the user 102 may present a request 104 to perform the operation 106 from the device 120 to the receiving device 150. The receiving device 150 may scan the device 120 and decode the verification information 122. In response, the information 123 may be identified. If it is determined that the information 123 is verified, the user 102 is allowed to perform the requested operation 106 using the device 120.

In an example scenario, assume that the user 102 is attempting to transfer the data item 124 to another party. For example, to this end, the user 102 may present the device 120 to the receiving device 150 which is configured to transfer the data item 124 to the other party. The receiving device 150 may determine whether the device 120 is associated with the user 102. To this end, the receiving device 150 may scan the device 120 and detect the verification information 122 embedded in the device 120. The receiving device 150 may decode the verification information 122 to extract the information 123. The receiving device 150 may determine whether the verification information 122 and/or information 123 is verified. If it is determined that the verification information 122 and/or information 123 is verified, the receiving device 150 may determine that the device 120 is associated with the user 102. In response, the receiving device 150 may perform the operation 106 requested by the user 102.

In this manner, the disclosed system 100 implements security measures to the device 120 so that only the authorized user(s) 102 will be able to use the device 120 to perform operations 106. Accordingly, the disclosed system 100 provides practical applications and technical improvements to the information security technology by implementing a device 120 that is uniquely associated with authorized users 102, therefore, the security of the devices 120 is increased, and secured access to the devices 120 is provided.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example Device

In some embodiments, the device 120 may be a physical device. For example, the physical device 120 may be a file, an instrument, a document, a currency bill, and/or the like. In embodiments where the device 120 is a physical device, the device 120 may be passive-meaning that it may not include a processor. In some embodiments, the device 120 may be a digital or virtual device. For example, the digital device 120 may be a digital wallet, a digital representation of a device, a file, a document, and/or the like.

The device 120 is embedded with the verification information 122 and data item 124. In some embodiments, the data item 124 may be written on the device 120. In some embodiments, the data item 124 may be encoded within the device 120, for example, using steganography techniques, QR code implementation techniques, or other information encoding techniques. In some embodiments, the data item 124 may be associated with the device 120 in any suitable manner. In some embodiments, the device 120 may be a representation of monetary value and the data item 124 may represent the amount of the monetary value. In such embodiments, the data item 124 may represent an available balance that may be used to acquire items or services using the device 120. Thus, in such embodiments, the device 120 may be used to acquire items or services. In some embodiments, the data item 124 may include private information associated with the user 102, such as name, address, phone number, etc.

The verification information 122 may be linked to the identity of the user 102. In some examples, the verification information 122 may include a watermark, a QR code, an image encoded with information 123, or any other type of representation of encoded information 123. In some embodiments, the verification information 122 may be encoded with certain information 123 that may be used for verifying the user 102 and determining whether the user 102 is authorized to use the device 120 to perform an operation 106. In some examples, the operation 106 may include transferring some or all of the data item 124 to another party, such as another user, entity, or device. In some examples, the information 123 may include an image, a signature, security questions and respective answers, and biometric data associated with the user 102. The information 123 may be preconfigured by the user 102. The verification information 122 may be extracted in conjunction with the secured operation 106 being verified.

In some embodiments, the user 102 may provide the information 123 to be encoded into the verification information 122 through the application 149. In such embodiments, the application 149 may receive the information 123 from the user 102 and encode the information 123 into the verification information 122. The user 102 may also provide the data item 124 to the application 149. The application 149 may generate the verification information 122 by encoding the information 123 into the verification information 122 using steganography techniques, QR code implementation techniques, or other information encoding techniques. Similarly, in some embodiments, the application 149 may generate an encoded data item 124 by encoding the data item 124 using steganography techniques, QR code implementation techniques, or other information encoding techniques. In some embodiments, the application 149 may generate an image 184 of the device 120, where the image 184 of device 120 may be scanned to capture the data item 124 and verification information 122.

In some embodiments, the user 102 may provide the data item 124 and the information 123 to a dispensing device (e.g., an automated teller machine, a kiosk, and/or the like) and the dispensing device may generate the verification information 122 by encoding the information 123 into the verification information 122 using steganography techniques, QR code implementation techniques, or other information encoding techniques. Similarly, the dispensing device may generate the encoded data item 124.

Sensor 126 may include a sensor circuit that is configured to detect the location coordinate of the device 120. For example, the sensor 126 may include a global positioning system (GPS) sensor circuit that is configured to track the GPS location of the device 120. The sensor 126 may communicate the location coordinate of the device 120 to the communication interface 128 of the device 120. The location of the device 120 may be used to determine whether the device 120 is requested to be used within a predefined location area as defined in the restriction 174.

The communication interface 128 is configured to enable wired and/or wireless communications (e.g., via network 110). The network interface 128 is configured to communicate data between the device 120 and other devices, user device 140, receiving device 150, server 160, systems, and domains. For example, the communication interface 128 may comprise an embedded subscriber identity module (eSIM) interface, NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The sensor 126 is configured to send and receive data using the communication interface 128. The communication interface 128 may be configured to use any suitable type of communication protocol as would be appreciated by one of ordinary skill in the art.

Example User Device

User device 140 is generally any device that is configured to process data and interact with users 102. Examples of user device 140 include, but are not limited to, a personal computer, a desktop computer, a workstation, a server, a laptop, a tablet computer, a mobile phone (such as a smartphone), etc. The user device 140 may include a user interface, such as a camera, a display, a microphone, keypad, or other appropriate terminal equipment usable by user 102. The user device 140 may include a hardware processor, memory, and/or circuitry configured to perform any of the functions or actions of the user device 140 described herein. For example, the user device 140 may include a processor 142 in signal communication with a network interface 144 and a memory 146. The memory 146 stores software instruction 148 that when executed by the processor 142, cause the processor 142 to perform one or more operations of the user device 140.

Processor 142 comprises one or more processors. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to implement the functions of the processor 142. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 as described in FIG. 2 and one or more operations of method 300 as described in FIG. 3.

Network interface 144 is configured to enable wired and/or wireless communications (e.g., via network 110). The network interface 144 is configured to communicate data between the user device 140 and other devices (e.g., server 160, receiving device 150, device 120), databases, systems, or domains. For example, the network interface 144 may comprise an eSIM interface, NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 142 is configured to send and receive data using the network interface 144. The network interface 144 may be configured to use any suitable type of communication protocol as would be appreciated by one of ordinary skill in the art.

Memory 146 may be a non-transitory computer-readable medium. The memory 146 may be volatile or non-volatile and may comprise a read-only memory (ROM), random-access memory (RAM), ternary content-addressable memory (TCAM), dynamic random-access memory (DRAM), and static random-access memory (SRAM). Memory 146 may be implemented using one or more disks, tape drives, solid-state drives, and/or the like. Memory 146 is operable to store the software instructions 148, application 149, verification information 122, data item 124, restrictions 174, images 184, and/or any other data or instructions. The software instructions 148 may comprise any suitable set of instructions, logic, rules, or code operable to execute the processor 142.

The application 149 may be a software, web, and/or mobile application and configured to provide a graphical user interface to interact with the device 120. For example, the application 149 may include text fields, buttons, check points, toggle buttons, and the like. to allow the user 102 to interact with or otherwise configure the device 120. The user 102 may pair or establish a communication between the application 149 (via the network interface 144) and the device 120 (via the communication interface 128), for example, via wire cables or wireless communication when the device 120 is within a wireless communication range of the user device 140.

The application 149 may be associated with the entity to which the server 160 belongs. The application 149 may be linked to the user profile 170 of the user 102. For example, the user 102 may be authorized by the entity associated with the server 160 to link the application 149 to the user profile 170 and the device 120. The user 102 may log in to their profile associated with the entity from the application 149. In response, the user 102 may configure the device 120 to represent some or all of the profile amount balance at the user profile 170 as the data item 124.

In configuring the device 120, the user 102 may use the application 149 to provide the information 123, data item 124, and restrictions 174 for the device 120. For example, the restrictions 174 may include the amount of the data item 124 to be accessible, a location area where the device 120 may be used, an expiration date for using the device 120, an intended use (e.g., allowing the device 120 to be used to acquire certain items and restricting the device 120 to be used to acquire other certain items), among others. In a particular example, the user 102 may be a parent who adds their child to the list of authorized users 182 from the application 149 and sets the restrictions 174 for the child to use the device 120 to acquire e a particular item, within a particular duration, and within a particular location area.

In some embodiments, the device 120 may include a memory to store such configurations or restrictions 174 and upon configuring the device 120 with such restrictions 174, the restrictions 174 may be communicated to the device 120. In some embodiments, the restrictions 174 may be encoded into the verification information 122 along with the information 123, thus, obviating the need for the device 120 to have a memory to store the restriction 174. In such embodiments, the restrictions 174 may be identified when the device 120 is scanned, similar to that described with respect to identifying the information 123.

In some embodiments, the user device 140 may generate the verification information 122 by encoding the information 123 using steganography techniques, QR code implementation techniques, or other information encoding techniques, thereby generating the verification communicate 122. Similarly, in some embodiments, the user device 140 may generate the data item 124 using steganography techniques, QR code implementation techniques, or other information encoding techniques.

In some embodiments, the user device 140 may communicate the verification information 122, data item 124, and restrictions 174 to the server 160. The server 160 may store the received data into the user profile 170, and associate the received data to the device 120 and user 102. When the device 120 is being presented to the receiving device 150 by a person (e.g., user 102) to be used, the server 160 may determine whether the verification information 122 is valid and whether the restriction 174 is met. In response to determining that the verification information 122 is valid and the restrictions 174 are met, the server 160 may communicate a message 186 to the receiving device 150 indicating that the device 120 may be used by the user presenting the device 120.

Receiving Device

The receiving device 150 is generally any device that is configured to process data. Examples of receiving devices 150 include, but are not limited to, a personal computer, a desktop computer, a workstation, a server, a laptop, a tablet computer, a mobile phone (such as a smartphone), a cash register, etc. The receiving device 150 may include a user interface, such as a camera, a display, a microphone, a keypad, or other appropriate terminal equipment usable by users. The receiving device 150 may include a hardware processor, memory, and/or circuitry configured to perform any of the functions or actions of the receiving device 150 described herein. For example, the receiving device 150 may include a processor 152 in signal communication with a network interface 154 and a memory 156. The memory 156 stores software instruction 158 that when executed by the processor 152, cause the processor 152 to perform one or more operations of the receiving device 150.

Processor 152 comprises one or more processors. The processor 152 is any electronic circuitry, including, but not limited to, state machines, one or more CPU chips, logic units, cores (e.g., a multi-core processor), FPGAs, ASICs, or DSPs. The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The processor 152 may include an ALU for performing arithmetic and logic operations, processor 152 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 158) to implement the functions of the processor 152. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-3. For example, the processor 152 may be configured to perform one or more operations of the operational flow 200 as described in FIG. 2 and one or more operations of method 300 as described in FIG. 3.

Network interface 154 is configured to enable wired and/or wireless communications (e.g., via network 110). The network interface 154 is configured to communicate data between the receiving device 150 and other devices (e.g., server 160, user device 140, device 120), databases, systems, or domains. For example, the network interface 154 may comprise an eSIM interface, NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 152 is configured to send and receive data using the network interface 154. The network interface 154 may be configured to use any suitable type of communication protocol as would be appreciated by one of ordinary skill in the art.

Camera 155 may be or include any camera that is configured to capture images of a field of view in front of the camera 155. Examples of the camera 155 may include charge-coupled device (CCD) cameras and complementary metal-oxide semiconductor (CMOS) cameras. The camera 155 is a hardware device that is configured to capture images 180a,b continuously, at predetermined intervals, or on-demand. For example, the camera 155 may be an internal camera or an external camera. In some examples, images 180a,b may include the images of the device 120 and/or images of the user 102. The receiving device 150 may use the images 180a,b to verify whether the device 120 is associated with the user 102.

Memory 156 may be a non-transitory computer-readable medium. The memory 156 may be volatile or non-volatile and may comprise a ROM, RAM, TCAM, DRAM, and SRAM. Memory 156 may be implemented using one or more disks, tape drives, solid-state drives, and/or the like. Memory 156 is operable to store the software instructions 158, verification information 122, scanning module 176, image processing algorithm 178, images 180a,b, and/or any other data or instructions. The software instructions 158 may comprise any suitable set of instructions, logic, rules, or code operable to execute the processor 152.

User interfaces 157 may include one or more user interfaces that are configured to interact with users 102. In certain embodiments, the user interfaces 157 may include peripherals of the receiving device 150, such as monitors, display screens, keyboards, mouses, trackpads, touchpads, microphones, webcams, speakers, and the like. In certain embodiments, the user interface 157 may include a graphical user interface, a software application, or a web application. The user 102 may use the user interfaces 157 to interact with the receiving device 150. For example, the user 102 may provide answers to the security questions, a signature, etc., using the interface 157.

The scanning module 176 may be implemented in hardware and/or software. The scanning module 176 may be implemented by the processor 152 executing the software instructions 158 and is generally configured to scan the device 120 and decode the verification information 122. In response, the scanning module 176 may determine the information 123 encoded in the verification information 122. In embodiments where the restrictions 174 are also encoded within the verification information 122, the scanning module 176 may be configured to determine the restrictions 174 from scanning and decoding the verification information 122.

In embodiments where the data item 124 is encoded and presented on the device 120, the scanning module 176 may be configured to scan and decode the data item 124. In response, the scanning module 176 may determine the amount encoded in the data item 124. In embodiments where the data item 124 is not encoded and is associated with (e.g., written on) the device 120, the scanning module 176 may not need to decipher or decode the data item 124. In some embodiments, the scanning module 176 may be implemented by image processing, optical character recognition (OCR), neural networks, near-field communication (NFC), and/or other techniques to detect, scan, and decode items on the device 120.

The image processing algorithm 178 may be implemented by the processor 152 executing the software instructions 158 and is generally configured to extract data from images, such as images 180. In some embodiments, the image processing algorithm 178 may include a support vector machine, neural network, random forest, k-means clustering, etc. For example, the image processing algorithm 178 may be implemented by a plurality of neural network (NN) layers, convolutional NN (CNN) layers, Long-Short-Term-Memory (LSTM) layers, Bi-directional LSTM layers, recurrent NN (RNN) layers, and the like. In another example, the image processing algorithm 178 may be implemented by a facial recognition algorithm, optical character recognition, text analysis, among others.

Example Server

Server 160 is generally a device configured to process data and communicate with other components of the system 100, domains, etc., via the network 110. In one example, server 160 may be a backend server associated with device 120, and is generally configured to oversee operations performed with the devices 120. The server 160 is further configured to provide software and/or hardware resources to the other components of the system 100. In the illustrated embodiment, the server 160 includes the processor 162 in signal communication with the network interface 164 and the memory 166. In other embodiments, the server 160 may be configured as shown or in another configuration.

Processor 162 comprises one or more processors. The processor 162 is any electronic circuitry, including, but not limited to, state machines, one or more CPU chips, logic units, cores (e.g., a multi-core processor), FPGAs, ASICs, or DSPs. The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations, processor 162 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 168) to implement the operations of the processor 162. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more operations of the operational flow 200 described in FIG. 2 and one or more operations of the method 300 as described in FIG. 3.

Network interface 164 is configured to enable wired and/or wireless communications (e.g., via network 110). The network interface 164 is configured to communicate data between the server 160 and other components of the system 100, databases, systems, and domains. For example, the network interface 164 may comprise a WIFI interface, LAN interface, a WAN interface, a modem, a switch, or a router. The processor 162 is configured to send and receive data using the network interface 164. The network interface 164 may be configured to use any suitable type of communication protocol as would be appreciated by one of ordinary skill in the art.

Memory 166 may be a non-transitory computer-readable medium. The memory 166 may be volatile or non-volatile and may comprise a ROM, RAM, TCAM, DRAM, and SRAM. Memory 166 may be implemented using one or more disks, tape drives, solid-state drives, and/or the like. Memory 166 is operable to store the software instructions 168, user profiles 170, messages 186, and/or any other data or instructions. The software instructions 168 may comprise any suitable set of instructions, logic, rules, or code operable to execute the processor 162.

The user profile 170 may include user profiles for users 102 who have a profile at an entity associated with the server 160. Each user profile 170 may be associated with a respective user 102 and may include user information 172, information about the device 120, verification information 122, restrictions 174, and a list of authorized users 182, among other information. The user information 172 may include a name, an address, a phone number, a balance amount associated with the profile of the user 102, and the like. The verification information 122, data item 124, restrictions 174, and list of authorized users 182 may be provided by the user 102 from the user device 140. The user 102 may use this information to configure the device 120, similar to that described above. The list of authorized users 182 may include users 102 who are authorized to use the device 120 to perform operations 106.

Example Operational Flow for Performing a Secured Operation Using the Device

FIG. 2 illustrates an example operational flow 200 of the system 100 (see FIG. 1) for performing a secured operation 106 using the device 120. The operational flow 200 may begin when the user 102 approaches the receiving device 150 and requests to use the device 120 to perform an operation 106 using the device 120. For example, the user 102 may present the request 104 to perform the operation 106 to the receiving device 150 using the user interfaces 157 or to the operator of the receiving device 150. For example, the operation 106 may include transferring some or all of the data item 124 to another party, such as another user, an entity, etc. In the same or other examples, the operation 106 may include acquiring items, products, or services using the device 120 that is associated with a value represented by a dollar amount as the data item 124.

The receiving device 150 may detect the presence of the device 120 when the device 120 is within a threshold distance 202 from the receiving device 150. The threshold distance 202 may be one inch, two inches, etc. For example, the receiving device 150 may detect the presence of the device 120 using NFC when the device 120 is within the NFC range from the receiving device 150.

Scanning and Decoding the Device

In response to detecting the device 120, the receiving device 150 may scan the device 120 using the scanning module 176, similar to that described in FIG. 1. In response to scanning the device 120, the receiving device 150 may detect the items displayed on and items embedded into the device 120. For example, the receiving device 150 (e.g., via the scanning module 175) may detect the data item 124 and verification information 122. In the case of verification information 122, the receiving device 150 may detect and decode the verification information 122 using steganography decoding techniques, QR decoding code implementation techniques, or other information from image decoding techniques. In response, the receiving device 150 may determine the information 123 that was encoded in the verification information 122.

In embodiments where the data item 124 is associated with (e.g., written on) the device 120, the receiving device 150 may detect the amount represented by the data item 124 by scanning the device 120, similar to that described in FIG. 1. In embodiments where the data item 124 is encoded, the receiving device 150 may detect and decode the data item 124 using steganography decoding techniques, QR decoding code implementation techniques, or other image decoding techniques.

Verifying Whether the Device is Associated with the User

In response to determining the information 123, the receiving device 150 may use the information 123 to determine whether the device 120 is associated with the user 102. In this process, the receiving device 150 may use any and any number of example embodiments described below.

In the example where the verification information 122 is encoded with an image 180a of the user 102 (i.e., where the information 123 includes the image of the user), in some embodiments, a new image 180b of the user 102 may be captured by a camera 155 associated with the receiving device 150. The receiving device 150 may implement the image processing algorithm 178 that includes a facial recognition technique to recognize the user shown in the image 180b. The receiving device 150 may compare the previous image 180a of the user 102 (extracted from the verification information 122) with the newly obtained image 180b of the user 102.

In some embodiments, the receiving device 150 may feed the newly received image 180b and the image 180a extracted from the verification information 122 to the image processing algorithm 178 to compare them with one another. For example, the receiving device 150 may extract features, such as edges, colors, shapes, etc. from each of the images 180a,b using the image processing algorithm 178. If the receiving device 150 determines that images 180a,b have corresponding features, it may determine that the person in both images 180a,b is the same person. If the user 102 shown in the extracted image 180a (extracted from the verification information 122) is the same person as the user 102 shown in the newly obtained image 180b, the receiving device 150 may determine that the verification information 122 and/or detected information 123 is verified. In response, the receiving device 150 may determine that the user 102 is authorized to use the device 120. Otherwise, the receiving device 150 may determine that the device 120 is not associated with the user 102, the verification information 122 and/or detected information 123 is not verified, and the user 102 is not allowed to use the device 120 to perform the requested operation 106.

In the example where the verification information 122 is encoded with a signature of the user 102 (i.e., where the information 123 includes the signature of the user 102), the receiving device 150 may display a message 204 on its display screen (an example of user interface 157), where the message 204 requests the user 102 to provide their signature. In response, the user 102 may provide their signature to the receiving device 150, e.g., on the touch-screen of the receiving device 150. The receiving device 150 may compare the newly received signature with the signature extracted from the verification information 122.

In some embodiments, the receiving device 150 may feed the newly received signature and the extracted signature to the image processing algorithm 178 to compare them with one another. For example, the receiving device 150 may extract features, such as edges, colors, shapes, etc. from each of the signatures using the image processing algorithm 178. If the receiving device 150 determines that signatures have corresponding features, it may determine that the signatures correspond to or match each other. If the newly received signature corresponds to the extracted signature, the receiving device 150 may determine that the verification information 122 and/or detected information 123 is verified. In response, the receiving device 150 may determine that the user 102 is authorized to use the device 120. Otherwise, the receiving device 150 may determine that the device 120 is not associated with the user 102, the verification information 122 and/or detected information 123 is not verified, and the user 102 is not allowed to use the device 120 to perform the requested operation 106.

In the example where the verification information 122 is encoded with security or authentication questions and their respective answers (i.e., where the information 123 includes the security or authentication questions and their respective answers), the receiving device 150 may display the security questions on its display screen and a message 204 requesting the user 102 to provide answers to the security questions. In response, the user 102 may provide the answers of the security questions to the receiving device 150, e.g., via a digital or physical keyboard of the receiving device 150. The receiving device 150 may compare previously provided answers to the security questions with the newly received answers. If the previously provided answers correspond to the newly received answers, the receiving device 150 may determine that the verification information 122 and/or detected information 123 is verified. In response, the receiving device 150 may determine that the user 102 is authorized to use the device 120. Otherwise, the receiving device 150 may determine that the device 120 is not associated with the user 102, the verification information 122 and/or detected information 123 is not verified, and the user 102 is not allowed to use the device 120 to perform the requested operation 106.

In some examples, the verification information 122 may include a QR code that may include a security question to identify recent legitimate transactions from a set of legitimate and fake transactions. The list of recent transactions may be displayed on the display screen of the receiving device 150. The message 204 may also be displayed on the display screen of the receiving device 150, where the message 204 requests the user 102 to select the legitimate transactions from the list. If the user 102 selects the legitimate transactions, the receiving device 150 may determine that the user 102 is associated with the device 120.

In the example where the verification information 122 is encoded with a biometric data associated with the user 102, such as fingerprint of the user 102 (i.e., where the information 123 includes the biometric data associated with the user 102), the receiving device 150 may scan the fingerprint of the user 102 and extract biometric data from the newly received fingerprint. The receiving device 150 may scan the fingerprint of the user 102 using the fingerprint scanner as a part of the user interface 157.

The receiving device 150 may compare the newly extracted fingerprints with the previously provided fingerprints. In some embodiments, the receiving device 150 may feed the newly received fingerprints and the extracted fingerprints to the image processing algorithm 178 to compare them with one another. For example, the receiving device 150 may extract features, such as edges, colors, shapes, etc. from each of the fingerprints using the image processing algorithm 178. If the receiving device 150 determines that fingerprints have corresponding features, it may determine that the fingerprints correspond to or match each other and belong to the same person. If the newly extracted fingerprints correspond to the previously provided fingerprints, the receiving device 150 may determine that the verification information 122 and/or detected information 123 is verified. In response, the receiving device 150 may determine that the user 102 is authorized to use the device 120. Otherwise, the receiving device 150 may determine that the device 120 is not associated with the user 102, the verification information 122 and/or detected information 123 is not verified, and the user 102 is not allowed to use the device 120 to perform the requested operation 106. Similar operations may be performed for other biometric data, including retina sample data associated with the user 102. In some examples, the user 102 may be asked (e.g., by an operator of the receiving device 150) to open the application 149 on the user device 120 and show that the application 149 is linked to the device 120.

In some embodiments, in response to determining that the verification information 122 and/or detected information 123 is verified, the receiving device 120 may perform the requested operation 106. In some embodiments where the device 120 is configured with restrictions 174, the receiving device 150 may detect the restrictions 174 from the verification information 122. In some embodiments where the device 120 is configured with restrictions 174, the receiving device 150 may receive the restrictions 174 from the server 160 in response to forwarding information about the device 120 (e.g., an image of the device 120, data item 124, information 123, etc.) and the user request to perform the operation to the server 160. In such embodiments, the receiving device 150 may determine whether the conditions indicated in the restrictions 174 are met. For example, the receiving device 150 may receive the location coordinate of the device 120 from the device 120 and determine whether the device 120 is within the predefined location area as indicated in the restrictions 174. If it is determined that the device 120 is within the predefined location area as indicated in the restrictions 174, the receiving device 150 may determine that the location condition from the restrictions 174 is met. The receiving device 150 may check whether other restrictions 174 are met. If it is determined that the conditions indicated in the restrictions 174 are met, the receiving device 150 may perform the requested operation 106. In some embodiments, after the expiration date for using the device 120 is passed, the balance indicated by the data item 124 may be returned back to the profile of the user 102.

Method for Performing a Secured Operation Using a Device

FIG. 3 illustrates an example flowchart of a method 300 for performing a secured operation 106 using a device 120 according to some embodiments of the present disclosure. Modifications, additions, or omissions may be made to method 300. Method 300 may include more, fewer, or other operations. For example, operations may be performed in parallel or in any suitable order. While at times, it is discussed that the system 100, device 120, user device 140, receiving device 150, server 160, or components of any of thereof perform certain operations, any suitable system or components may perform one or more operations of the method 300. For example, one or more operations of method 300 may be implemented, at least in part, in the form of software instructions 148, 158, 168, of FIG. 1, stored on a tangible non-transitory computer-readable medium (e.g., memory 146, 156, 166 of FIG. 1) that when run by one or more processors (e.g., processor 142, 152, 162, of FIG. 1) may cause the one or more processors to perform operations 302-314.

At operation 302, the receiving device 150 detects the presence of the device 120. For example, the receiving device 150 may detect the presence of the device 120 when the device 120 comes within the threshold distance 202 of the receiving device 150, similar to that described in FIG. 2. In some examples, the device 120 may be inserted into a slot entrance of the receiving device 150. For example, the user 102 may insert the device 120 into the slot entrance of the receiving device 150. In some examples, the user 102 may present the device 120 to the receiving device 150 and the receiving device 150 may detect the device 120 via NFC.

At operation 304, the receiving device 150 receives a request 104 to perform an operation 210 using the device 120. For example, the user 102 may provide the request 104 to the receiving device 150 using user interfaces 157 of the receiving device 150. In another example, the user 102 may convey the request 104 to an operator of the receiving device 150 and the operator of the receiving device 150 may input the request 104 to the receiving device 150.

At operation 306, the receiving device 150 scans the device 120. For example, the receiving device 150 may use the scanning module 176 to scan the device 120, similar to that described in FIG. 2.

At operation 308, the receiving device 150 decodes the verification information 122. For example, the receiving device 150 may use the scanning module 176 to decode the verification information 122. In response, the receiving device 150 may determine the information 123 that is encoded in the verification information 122. In embodiment where the data item 124 is encoded, the receiving device 150 may decode the data item 124 using the scanning module 176.

At operation 310, the receiving device 150 determines whether the verification information 122 and/or detected information 123 is verified. In this process, for example, the receiving device 150 may obtain new information from the user 102, such as answers to security questions, signature, image, etc. that are decoded from the verification information 122 and compare them to respective information that is previously provided by the user 102. Several example operations for verifying the verification information 122 are described in FIG. 2. If the receiving device 150 determines that the verification information 122 and/or detected information 123 is verified, the method 300 may proceed to operation 314. Otherwise, the method 300 may proceed to operation 312. In some embodiments where the device 120 is configured with the restrictions 174, the receiving device 150 may also determine whether the conditions in the restrictions 174 are met. If it is determined that the conditions in the restrictions 174 are met, the method 300 may proceed to operation 314. Otherwise, the method 300 may proceed to operation 312.

At operation 312, the receiving device 150 may deny the requested operation 212. For example, the receiving device 150 may determine that the user 102 is not authorized to use the device 120. At operation 314, the receiving device 150 performs the requested operation 212.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for performing secured operations, comprising:
   a first device, wherein the first device comprises:
      a predefined data item, wherein the predefined data item is associated on the first device or embedded into the first device;
      a sensor circuit embedded within the first device and configured to detect a location coordinate of the first device;
      a network interface embedded within the first device and configured to communicate the detected location coordinate of the first device; and
      a verification information embedded within the first device, wherein:
         the verification information is uniquely associated with a first user associated with the first device;
         the verification information is encoded with information associated with the first user; and
         the verification information is linked to an identity of the first user; and
   a second device communicatively coupled to the first device and comprising:
      a communication interface configured to capture the verification information when the first device is within a threshold distance from the second device; and
      a processor operably coupled to the communication interface and configured to:
         detect the information that is encoded within the verification information;
         determine whether the information is verified; and
         in response to determining that the information is verified, transfer at least
      a portion of the predefined data item.

2. The system of claim 1, wherein:
   the verification information comprises one or more authentication questions that are preconfigured by the first user; and
   the verification information is verified in response to a preconfigured answer to each of the one or more authentication questions being received.

3. The system of claim 1, wherein:
   the verification information comprises an image of the first user; and
   the verification information is verified in response to a second user attempting to use the first device to transfer at least the portion of the predefined data item corresponding to the first user shown in image.

4. The system of claim 1, wherein:
   the verification information comprises a previously provided biometric data associated with the first user;
   the previously provided biometric data comprises a fingerprint of the first user; and
   the verification information is verified in response to a newly obtained biometric data associated with a second user attempting to use the first device to transfer at least the portion of the predefined data item corresponding to the previously provided biometric data.

5. The system of claim 1, wherein:
   the verification information comprises a previously provided signature associated with the first user; and
   the verification information is verified in response to a newly obtained signature associated with a second user attempting to use the first device to transfer at least the portion of the predefined data item corresponding to the previously provided signature.

6. The system of claim 1, wherein:
   the first device is associated with one or more restrictions; and
   the one or more restrictions comprise:
      an expiration date within which transferring at least the portion of the predefined data item should be performed;
      a location for transferring at least the portion of the predefined data item; or
      the portion of the predefined data item to be communicated.

7. The system of claim 6, wherein transferring at least the portion of the predefined data item is performed in response to the one or more restrictions being met.

8. A device for performing secured operations, comprising:
   a predefined data item, wherein the predefined data item is associated with the device or embedded into the device;
   a sensor circuit embedded within the device and configured to detect a location coordinate of the device;
   a network interface embedded within the device and configured to communicate the detected location coordinate of the device; and
   a verification information embedded within the device, wherein:
      the verification information is uniquely associated with a first user associated with the device;
      the verification information is encoded with information associated with the first user; and
      the verification information is linked to an identity of the first user;
   wherein:
      the verification information is configured to be extracted in conjunction with a secured operation being performed; and
      the secured operation is performed in response to the verification information being verified.

9. The device of claim 8, wherein:
   the verification information comprises one or more authentication questions that are preconfigured by the first user; and
   the verification information is verified in response to a preconfigured answer to each of the one or more authentication questions being received.

10. The device of claim 8, wherein:
    the verification information comprises an image of the first user; and
    the verification information is verified in response to a second user attempting to use the device to perform the secured operation corresponding to the first user shown in image.

11. The device of claim 8, wherein:
    the verification information comprises a previously provided biometric data associated with the first user;
    the previously provided biometric data comprises a fingerprint of the first user; and
    the verification information is verified in response to a newly obtained biometric data associated with a second user attempting to use the device to perform the secured operation corresponding to the previously provided biometric data.

12. The device of claim 8, wherein:
    the verification information comprises a previously provided signature associated with the first user; and
    the verification information is verified in response to a newly obtained signature associated with a second user attempting to use the device to perform the secured operation corresponding to the previously provided signature.

13. The device of claim 8, wherein:
the device is associated with one or more restrictions; and
the one or more restrictions comprise:
- an expiration date within which the secured operation should be performed;
- a location for performing the secured operation; or
- a portion of the predefined data item to be communicated.

14. The device of claim 13, wherein the secured operation is performed in response to the one or more restrictions being met.

15. A method for performing secured operations, comprising:
capturing, by a second device, a verification information embedded within a first device, wherein:
- the first device is associated with a predefined data item;
- the verification information is uniquely associated with a first user associated with the first device;
- the verification information is encoded with information associated with the first user;
- the verification information is linked to an identity of the first user; and
- the verification information is captured when the first device is within a threshold distance from the second device;

detecting the information that is encoded within the verification information;
determining whether the information is verified; and
in response to determining that the information is verified, transferring at least a portion of the predefined data item.

16. The method of claim 15, wherein:
the verification information comprises one or more authentication questions that are preconfigured by the first user; and
the verification information is verified in response to a preconfigured answer to each of the one or more authentication questions being received.

17. The method of claim 15, wherein:
the verification information comprises an image of the first user; and
the verification information is verified in response to a second user attempting to use the first device to transfer at least the portion of the predefined data item corresponding to the first user shown in image.

18. The method of claim 15, wherein:
the verification information comprises a previously provided biometric data associated with the first user;
the previously provided biometric data comprises a fingerprint of the first user; and
the verification information is verified in response to newly obtained biometric data associated with a second user attempting to use the first device to transfer at least the portion of the predefined data item corresponding to the previously provided biometric data.

19. The method of claim 15, wherein:
the first device is associated with one or more restrictions;
the one or more restrictions comprise:
- an expiration date within which a secured operation should be performed;
- a location for performing the secured operation; or
- a portion of the predefined data item to be communicated; and the secured operation is performed in response to the one or more restrictions being met.

* * * * *